United States Patent
Vijayan et al.

(10) Patent No.: US 11,519,775 B2
(45) Date of Patent: Dec. 6, 2022

(54) APPLIANCE WITH SENSING FOR LOAD DETERMINATION

(71) Applicant: Haier US Appliance Solutions, Inc., Wilmington, DE (US)

(72) Inventors: Vineeth Vijayan, Louisville, KY (US); Choon Jae Ryu, Prospect, KY (US); Matthew R. Hunter, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 215 days.

(21) Appl. No.: 17/111,681

(22) Filed: Dec. 4, 2020

(65) Prior Publication Data
US 2022/0178734 A1    Jun. 9, 2022

(51) Int. Cl.
*G01G 5/00* (2006.01)
*F25D 25/02* (2006.01)
*F25D 29/00* (2006.01)
*G01G 5/04* (2006.01)

(52) U.S. Cl.
CPC ............ *G01G 5/003* (2013.01); *F25D 25/02* (2013.01); *F25D 29/005* (2013.01); *G01G 5/006* (2013.01); *G01G 5/04* (2013.01)

(58) Field of Classification Search
CPC .. F25D 25/02; F25D 29/005; F25D 2400/361; F25D 2700/06; F25D 2500/06; G01G 5/003; G01G 5/006; G01G 5/04; G01G 19/42; A47B 96/021; A47F 5/0043
See application file for complete search history.

(56) References Cited

U.S. PATENT DOCUMENTS

| | | | |
|---|---|---|---|
| 4,791,411 A * | 12/1988 | Staar | G06Q 10/087 340/568.1 |
| 7,810,891 B2 | 10/2010 | Lee et al. | |
| 11,306,966 B2 * | 4/2022 | Schroeder | F25D 25/02 |
| 2003/0131541 A1 * | 7/2003 | Lee | F25D 17/065 52/79.1 |
| 2009/0255292 A1 * | 10/2009 | Benz | A47B 57/06 700/275 |
| 2014/0320040 A1 * | 10/2014 | Katu | H05B 45/20 362/92 |
| 2018/0259245 A1 * | 9/2018 | Abeygunawardana | A47B 57/06 |
| 2019/0353421 A1 | 11/2019 | Junge et al. | |
| 2020/0208904 A1 * | 7/2020 | Choy | F25D 23/126 |
| 2021/0055043 A1 * | 2/2021 | Wantland | H01R 25/162 |
| 2021/0088270 A1 * | 3/2021 | Allgeier | F25D 25/024 |
| 2021/0164725 A1 * | 6/2021 | Kumar | F25D 25/024 |
| 2022/0067642 A1 * | 3/2022 | Barton | G01G 19/52 |
| 2022/0252337 A1 * | 8/2022 | Ryu | F25D 25/02 |

FOREIGN PATENT DOCUMENTS

| | | |
|---|---|---|
| CN | 205619681 U | 10/2016 |
| JP | 2017/215067 A | 12/2017 |
| KR | 2014/0127590 A | 11/2014 |

* cited by examiner

*Primary Examiner* — Hiwot E Tefera
(74) *Attorney, Agent, or Firm* — Dority & Manning, P.A.

(57) ABSTRACT

A refrigerator appliance with sensing for load determination including a shelf and shelf support with a resilient member positioned so as to be compressed by the weight of food items placed on the shelf. Changes in pressure or flowrate of a fluid in the resilient member are used to detect changes in the weight of food items. The appliance can be configured to execute one or more events based on the detected changes.

19 Claims, 8 Drawing Sheets

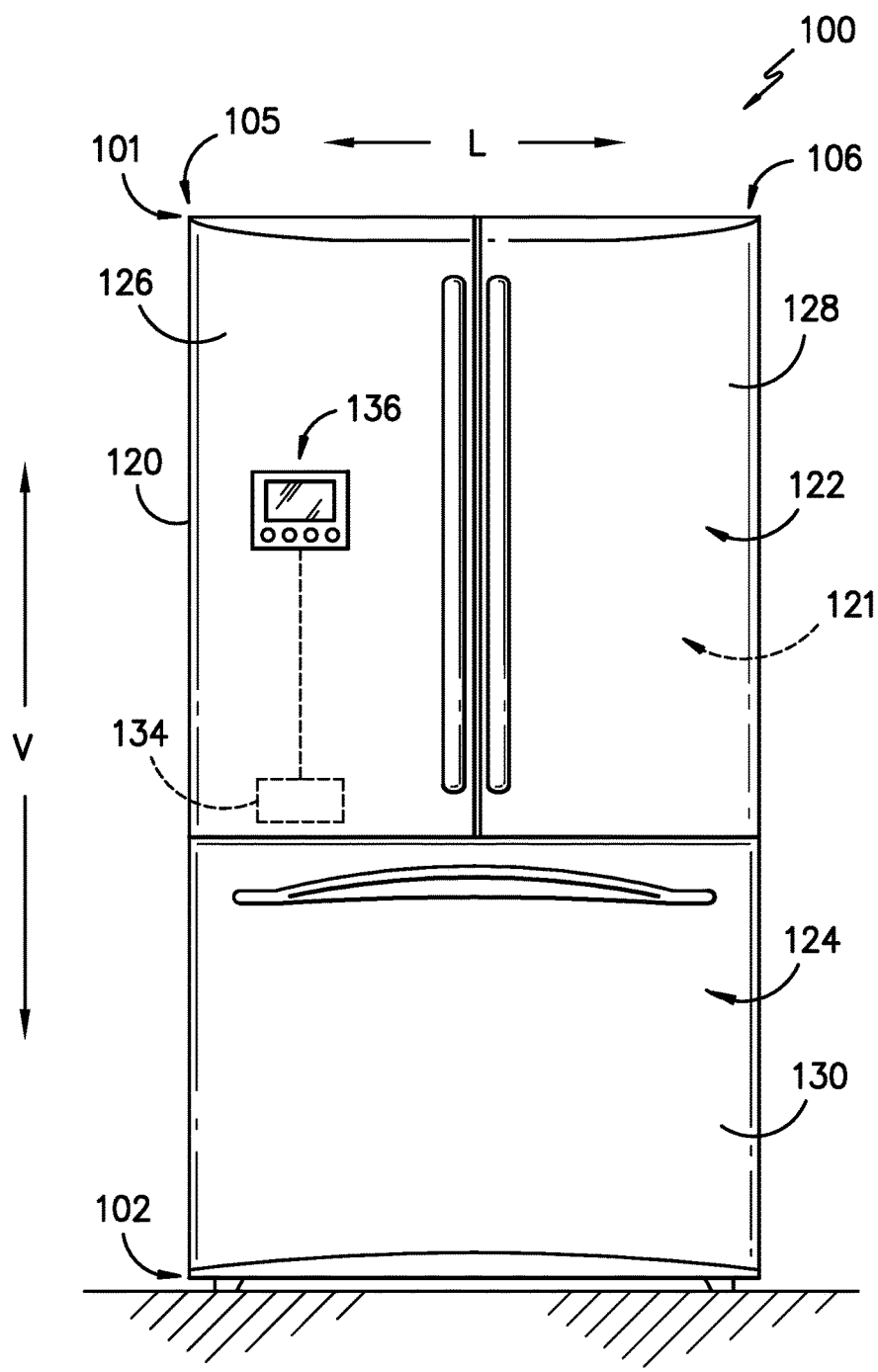
FIG. -1-

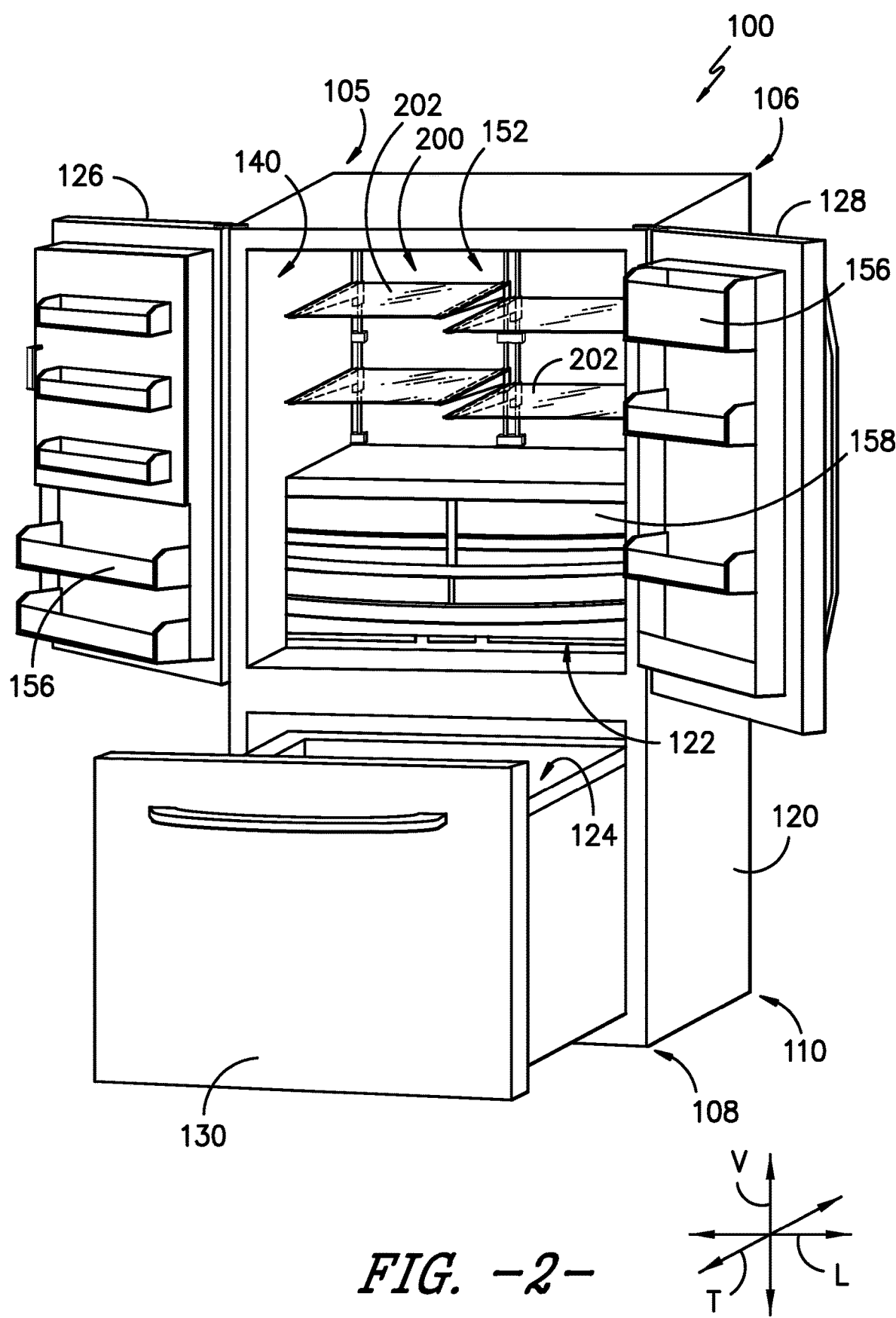
FIG. -2-

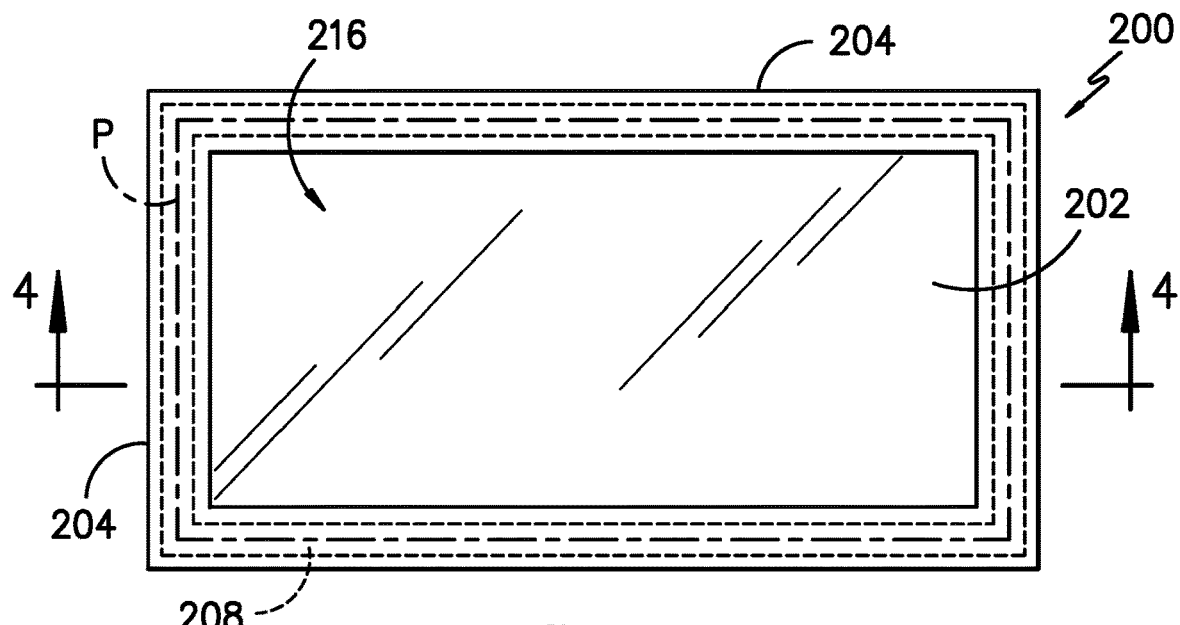
FIG. -3-
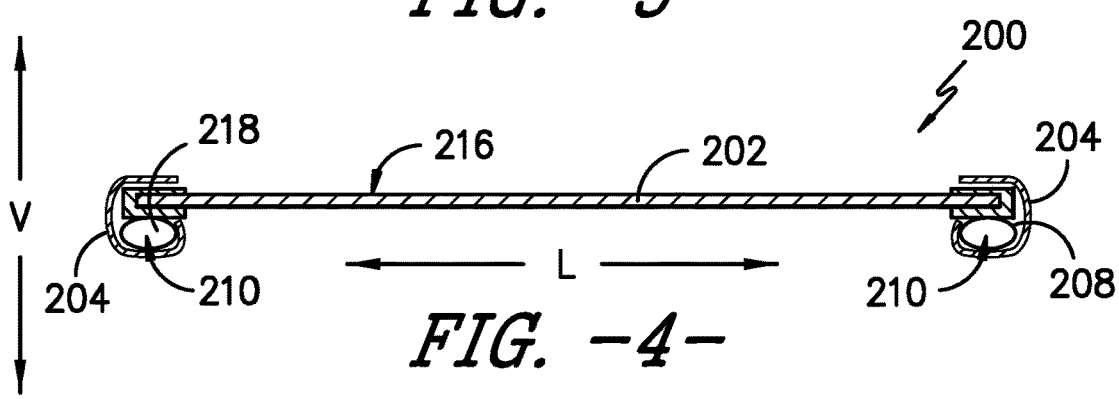
FIG. -4-
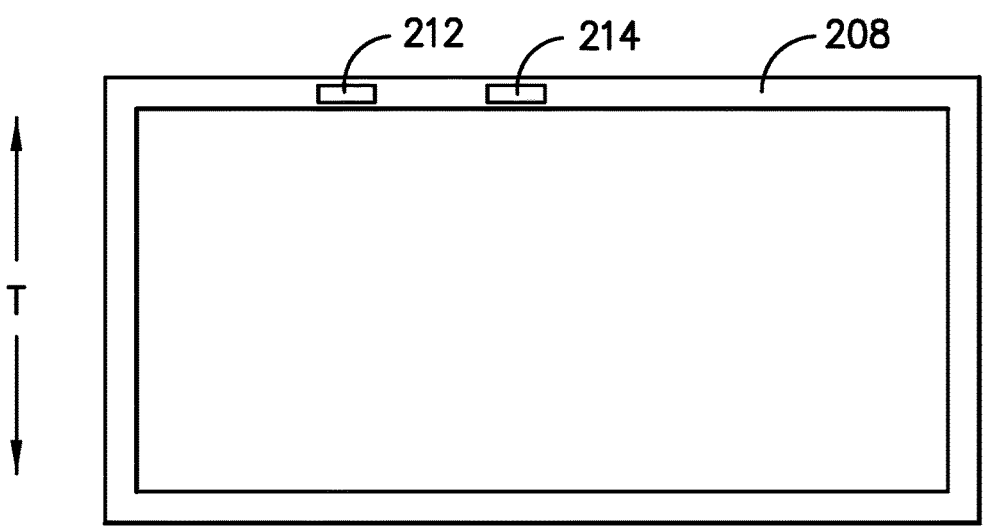
FIG. -5-

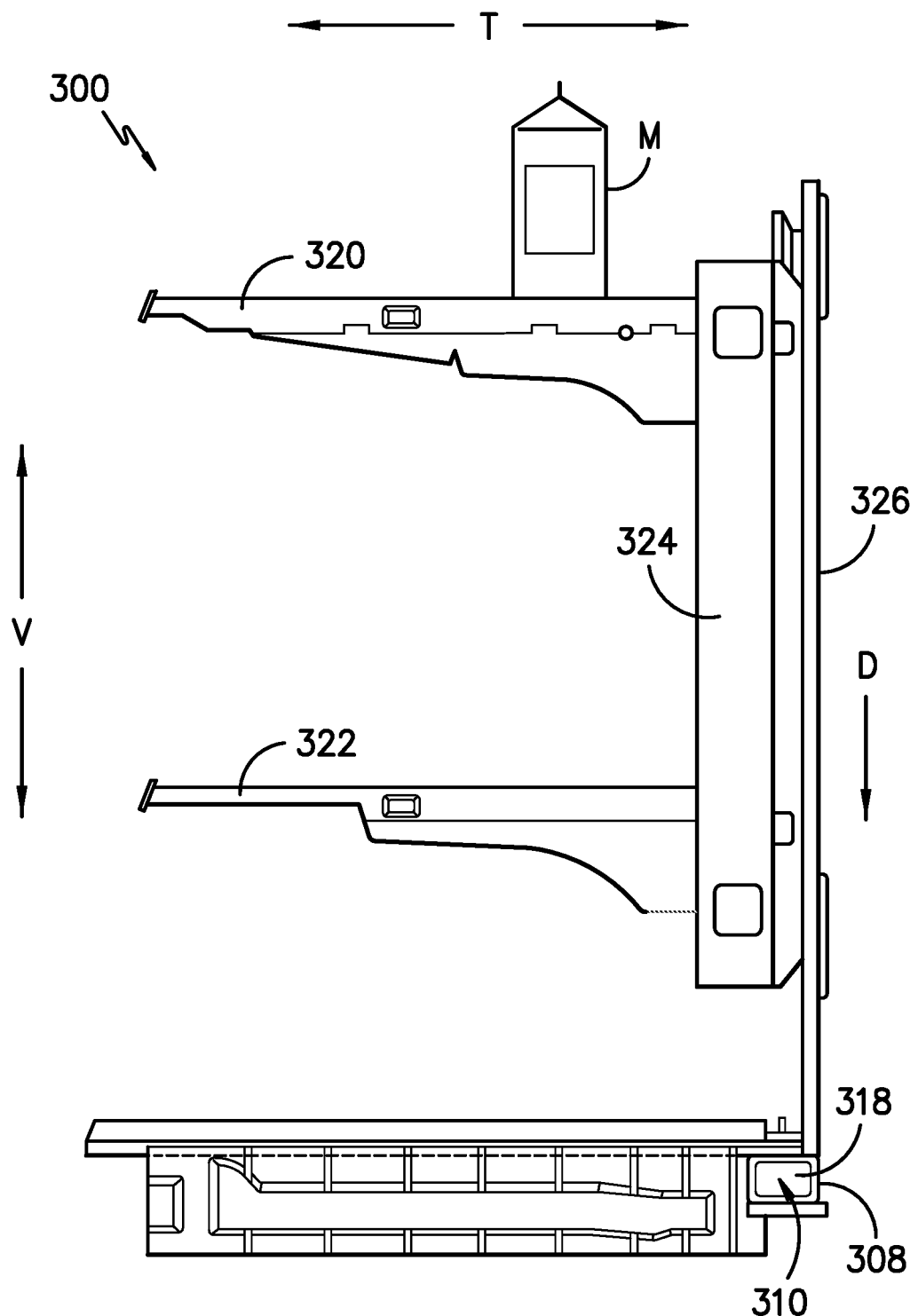
FIG. -6-

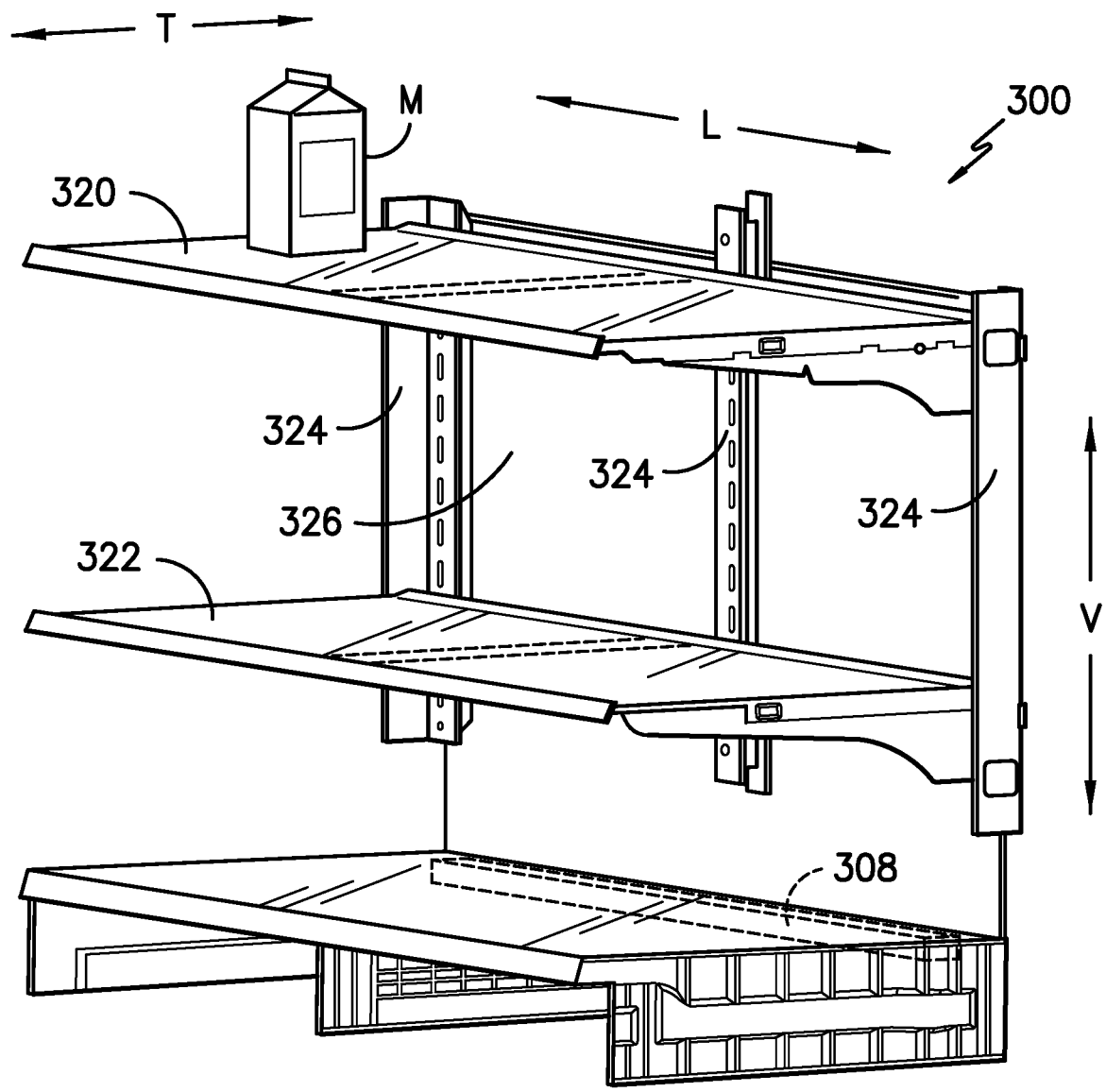
FIG. -7-

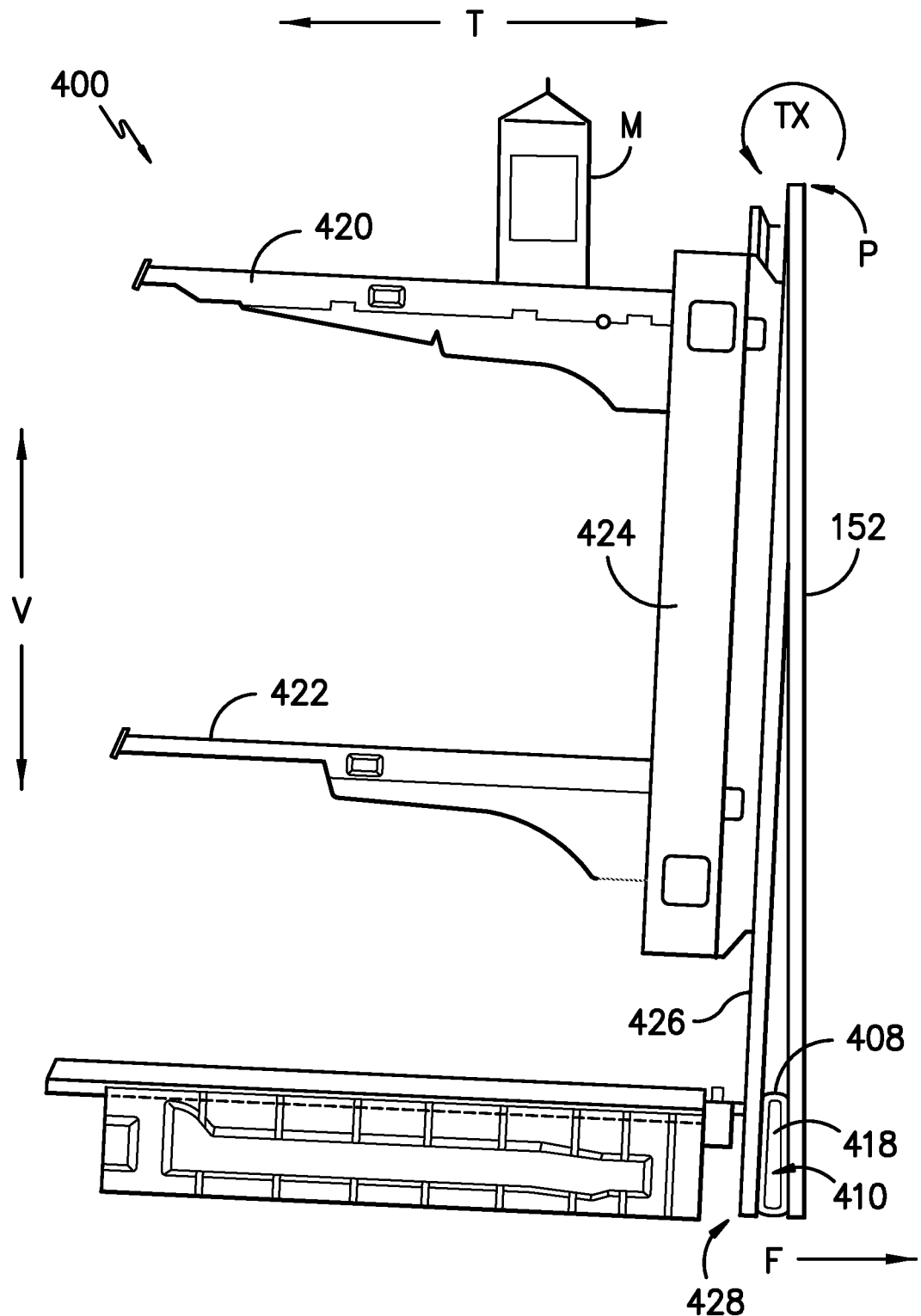
FIG. -8-

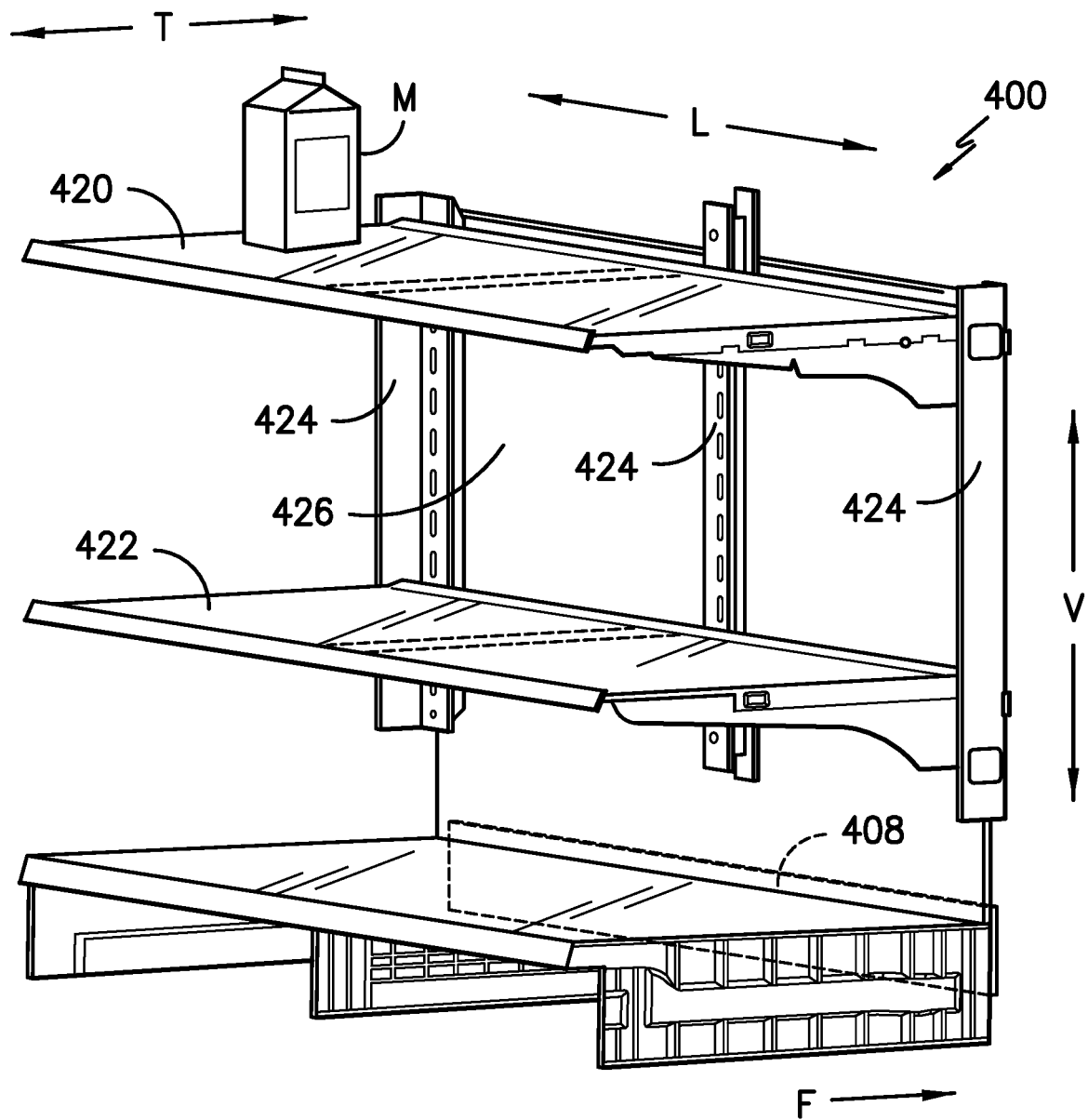
FIG. -9-

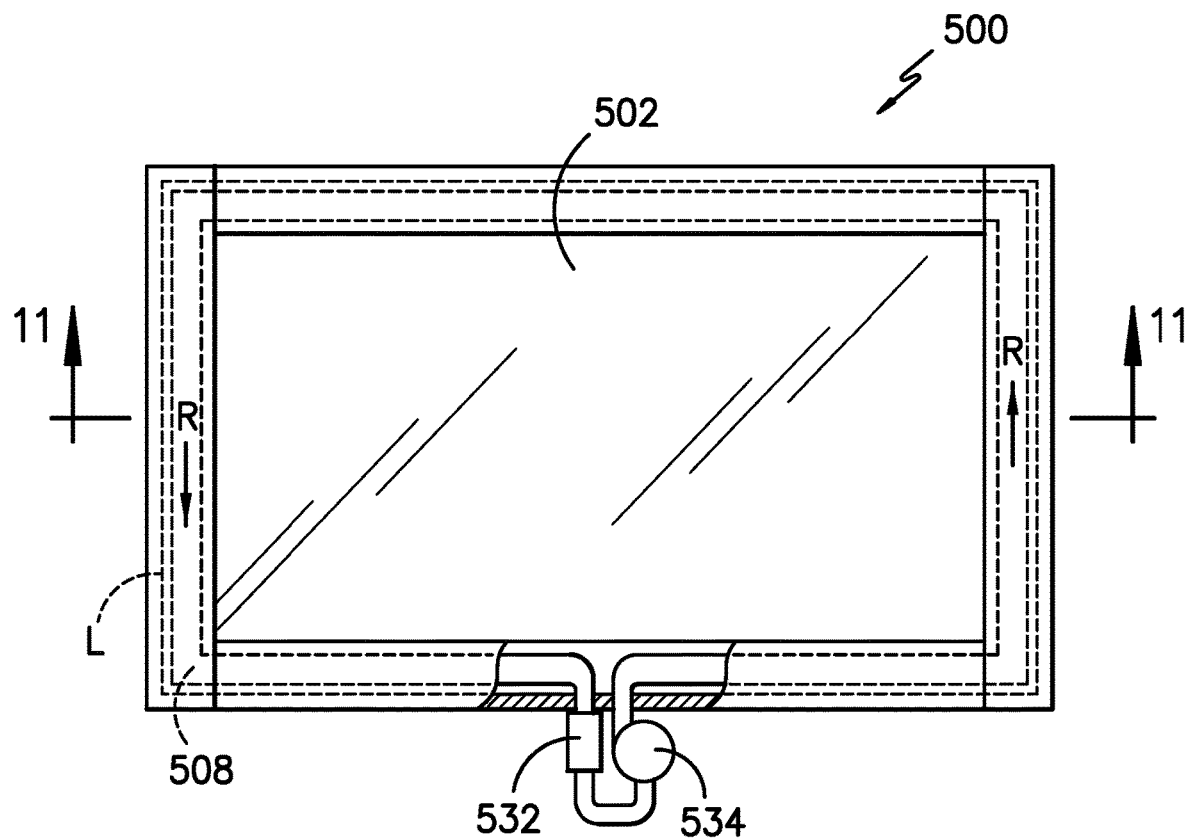
FIG. -10-
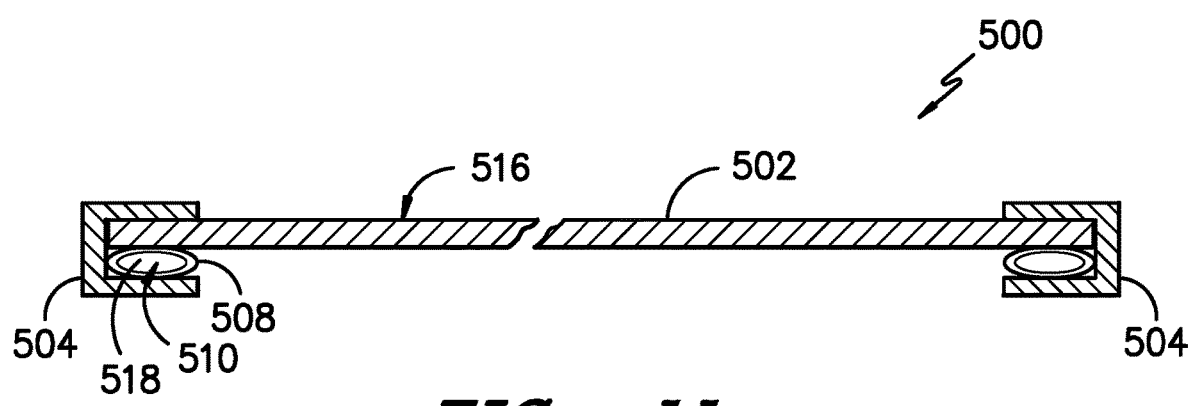
FIG. -11-

APPLIANCE WITH SENSING FOR LOAD DETERMINATION

FIELD OF THE INVENTION

The subject matter of the present disclosure relates generally to an appliance with load sensing, and more particularly to an appliance that can detect the weight of one or more objects placed on a shelf of the appliance.

BACKGROUND OF THE INVENTION

Refrigerated appliances are used to store food items in both commercial and residential applications. Since food items are consumed or perish over time, such must be replenished. Some food items, e.g., dairy items, may be depleted more quickly and require more frequent replacement whereas other items may last longer or be consumed less quickly. In a commercial setting, the rate of consumption may vary with the level of business activity.

Conventionally, users have relied on manually checking the contents of a refrigerated appliance to determine what items must be replaced, sometimes creating a list for purposes of ordering or grocery shopping. With the rise in e-commerce and residential delivery of food items, various techniques are emerging relating to automatic ordering and delivery. Such includes content or inventory management systems that may rely on various features to determine what items have been removed, added, otherwise changed in the contents of the appliance.

By way of example, camera systems have been proposed that may rely on image recognition of the contents placed into the compartment of the refrigerated appliance. The systems may require associated electronics for performing the algorithms related to such image recognition. Barcode or radio frequency identification devices may also allow the appliance to scan or otherwise identify items as such are placed into, or removed from, the refrigerated appliance. Of course, such may require food packaging compatible with the scanning devices. Different levels of interaction or assistance by the user of the appliance may be required depending upon the system employed.

The use of a load cell to weigh items placed on a e.g., an inventory plate has been proposed as set forth in U.S. Patent Publication No. 20190353421. The load cell can be utilized to detect changes in weight on the inventory plate. While providing certain advantages, load cells may add certain expense and complexity in the manufacture of a refrigerated appliance. Challenges also include incorporating the load cell without detracting from desirable aesthetics—particularly within the interior of the appliance.

Accordingly, a refrigerated appliance with features that can be used to determine changes in the contents of the refrigerated appliance would be useful. More particularly, a refrigerated appliance that can determine changes in the amount of food items stored in the appliance by detecting changes in weight of such contents is desirable. The ability to readily incorporate such features without undesirably affecting the aesthetics of the appliance would be particularly beneficial.

BRIEF DESCRIPTION OF THE INVENTION

Additional aspects and advantages of the invention will be set forth in part in the following description, or may be apparent from the description, or may be learned through practice of the invention.

In one exemplary embodiment, the present invention provides a refrigerator appliance that defines a vertical direction, a lateral direction, and a transverse direction. The refrigerator appliance includes a cabinet defining a chamber for the receipt of food items. A door is rotatably supported by the cabinet to provide selective access to the chamber. A shelving assembly is included and has a shelf positioned in the chamber and configured for receipt of food items and a shelf support configured to support the shelf and food items placed thereon. A resilient member is positioned in mechanical communication with the shelf such that food items place on the shelf causes the resilient member to be compressed. The resilient member can include a sealed chamber containing a fluid. A pressure sensor is in communication with the fluid and is configured to measure the pressure of fluid in the sealed chamber.

In another exemplary embodiment, the present invention includes a refrigerator appliance having a cabinet defining a chamber for the receipt of food items. A door rotatably is hinged to the cabinet to provide selective access to the chamber. A shelving assembly is provided that includes a shelf positioned in the chamber and configured for receipt of food items. A shelf support is configured to support the shelf. A resilient member is positioned in mechanical communication with the shelf such that food items placed on the shelf causes the resilient member to be compressed. The resilient member defines a sealed chamber containing a fluid within a loop. A pump circulates fluid within the loop defined by the resilient member. A flow meter is provided for making flow rate measurements on the flow of fluid within the loop of the resilient member.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a front view of an exemplary appliance of the present invention.

FIG. 2 provides a perspective view of the exemplary appliance of FIG. 1, with certain doors and a drawer shown in an open position to reveal the interior of the appliance.

FIG. 3 is a top view of an exemplary shelving assembly of the invention and FIG. 4 is a profile or end view thereof.

FIG. 5 is a top view of an exemplary resilient member of the present invention.

FIG. 6 is a side view of another exemplary shelving assembly of the present invention and FIG. 7 is a perspective view thereof.

FIG. 8 is a side view of another exemplary shelving assembly of the present invention and FIG. 9 is a perspective view thereof.

FIG. 10 is a top view of another exemplary shelving assembly of the invention and FIG. 11 is a profile or end view thereof.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front view of a refrigerator appliance 100 according to an exemplary embodiment of the present subject matter. Refrigerator appliance 100 extends between a top 101 and a bottom 102 along a vertical direction V. Refrigerator appliance 100 also extends between a first side 105 and a second side 106 along a lateral direction L. A transverse direction T (FIG. 2) is defined perpendicular to the vertical and lateral directions V, L. Accordingly, vertical direction V, lateral direction L, and transverse direction T are mutually perpendicular and form an orthogonal direction system.

Refrigerator appliance 100 includes a housing or cabinet 120 defining an interior volume 121. Cabinet 120 also defines an upper fresh food chamber 122 and a lower freezer chamber 124 arranged below the fresh food chamber 122 on the vertical direction V. As such, refrigerator appliance 100 is generally referred to as a bottom mount refrigerator. In this exemplary embodiment, cabinet 120 also defines a mechanical compartment (not shown) for receipt of a sealed cooling system (not shown). It will be appreciated that the present subject matter can be used with other types of refrigerators (e.g., side-by-sides), freezer appliances, other types of appliances, and/or any other suitable shelving system. Consequently, the description set forth herein is for exemplary purposes only and is not intended to limit the scope of the present subject matter in any aspect.

Refrigerator appliance 100 includes refrigerator doors 126, 128 that are rotatably hinged to an edge of cabinet 120 for accessing fresh food chamber 122. It should be noted that while doors 126, 128 are depicted in a "french door" configuration, any suitable arrangement or number of doors is within the scope and spirit of the present subject matter. A freezer door 130 is arranged below refrigerator doors 126, 128 for accessing freezer chamber 124.

Operation of refrigerator appliance 100 can be regulated by a controller 134 that is operatively coupled to a user interface panel 136. Panel 136 provides selections for user manipulation of the operation of refrigerator appliance 100 such as e.g., interior shelf lighting settings. In response to user manipulation of user interface panel 136, controller 134 operates various components of refrigerator appliance 100. Controller 134 may include a memory and one or more processors, microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

Controller 134 may be positioned in a variety of locations throughout refrigerator appliance 100. In the illustrated embodiment, controller 134 is located within door 126. In such an embodiment, input/output ("I/O") signals may be routed between the controller and various operational components of refrigerator appliance 100. In one embodiment, user interface panel 136 may represent a general purpose I/O ("GPIO") device or functional block. The user interface 136 may include input components, such as one or more of a variety of electrical, mechanical or electro-mechanical input devices including rotary dials, push buttons, and touch pads. User interface 136 may include a display component, such as a digital or analog display device designed to provide operational feedback to a user. The user interface 136 may be in communication with controller 134 via one or more signal lines or shared communication busses.

FIG. 2 provides a front, perspective view of refrigerator appliance 100 having refrigerator doors 126, 128 in an open position to reveal the interior of fresh food chamber 122. Additionally, freezer door 130 is shown in an open position to reveal the interior of freezer chamber 124. As shown more clearly in FIG. 2, refrigerator appliance 100 extends in the transverse direction T between a front end 108 and a rear end 110.

As shown in FIG. 2, for this exemplary embodiment, fresh food chamber 122 of refrigerator appliance 100 includes a shelving assembly 200 mounted to a rear wall 152 of cabinet 120. More specifically, shelving system 200 includes two columns of shelves 202 spaced apart generally along the vertical direction V. It should be appreciated that refrigerator appliance 100 may include any suitable number of shelves 202 in any suitable position or configuration. For example, in alternative embodiments, shelving assembly 200 could also include shelves 202 mounted to, or supported upon, another surface within the interior of cabinet 120, such as to one of both of the opposing sidewalls 140 of cabinet 120 or in the freezer chamber 124. For example, shelves 202 could be configured in a single column of shelves supported on both opposing sidewalls 140 or a combination of sidewalls 140 and rear wall 152. Other configurations for shelving assembly 200 may be use as well including adjustable shelving systems. For this embodiment, appliance 100 also includes various shelves 202, drawers 158, and can include other compartments as will be understood by one or ordinary skill in the art.

FIGS. 3 and 4 illustrate an exemplary embodiment of one of the shelves 202 of the present invention as may be used in appliance 100. For this embodiment, shelf 202 is supported by shelf support 204, which in turn may be supported upon opposing sidewalls 140, rear wall 152, and/or other parts of appliance 100. Shelf 202 is configured for receipt of one or more food items placed on top surface 216. The embodiment will be explained here with reference to a single shelf. However, using the teachings disclosed herein, one of ordinary skill in the art will understand that multiple shelves may be used within the scope of the present invention and claims that follow.

For this exemplary embodiment, as best seen in FIG. 3, shelf 202 and shelf support 204 are coextensive with each other and collectively define a perimeter P. A resilient member 208 is positioned in mechanical communication with the shelf 202 and shelf support 204. Resilient member 208 includes a sealed chamber 210 containing a fluid 218 and may be constructed from a variety of flexible materials that will allow changes in the weight of items on shelf 202 to be transmitted to the fluid 218 contained within sealed chamber 210. In one exemplary embodiment, resilient member 208 may be constructed from a tube made of polyethylene. Other materials may be used as well.

As used herein, "mechanical communication" means resilient member 208 is positioned relative to shelf 202 such that food items placed on top surface 216 of shelf 202 will compress resilient member 208 and, accordingly, affect the pressure of fluid 218 in a manner than can be used to determine the changes in weight of one or more food items placed on shelf 202 including weight changes caused by the addition, removal, and/or consumption of such food item. Such compression may be through the direct or indirect application of force and may be applied through a torque as well.

Accordingly, resilient member 208 may be direct contact with shelf 202 and support 204 as shown in FIG. 4. In other embodiments, resilient member may be in indirect contact with one or both of shelf 202 and support 204 but in a known relationship such that the effect on the pressure of fluid 218 can be used to determine the changes in weight associated with one or more food items placed on, or removed from, shelf 202. In still other embodiments, resilient member 208 may be in contact (direct or indirect) with a shelf and wall of the appliance (as will be further described) such that changes in the weight of food items placed on the shelf affects the pressure of fluid in member 208 in a known way.

Referring to FIG. 5, resilient member 208 includes a pressure sensor 212 that provides pressure measurements of fluid 218. For this exemplary embodiment, pressure sensor 212 is contained within the sealed chamber 210 of resilient member 208 and communicates pressure measurements to controller 134. For example, pressure sensor 212 may be connected to controller 134 using various signals including Wi-Fi, Bluetooth, Bluetooth Low Energy, and others.

Pressure sensor 212 may include a battery or other energy storage device for providing power needed to measure the pressure of fluid 218 and signal such measurements to controller 134. In other embodiments, pressure sensor 212 may be partially contained within sealed chamber 210 of resilient member 208 and may also have a portion extending therefrom including e.g., a connector or plug for connecting with appliance 100 to provide power and/or communication signals containing pressure measurements.

By way of example, the placement, consumption, or removal of an item on shelf 202 will change the pressure detected by pressure sensor 212, which is communicated to controller 134. Appliance 100 can use these changes in the pressure measurements of fluid 218 to execute a variety of different actions helpful to the user. For example, one or more decreases in the measured pressure could be used by controller 134 to send a notification to the user indicative of the consumption of one or more food items place on shelf 202. Changes in pressure could also be calibrated with the known quantities of food items (e.g., a known weight of a container of milk of a certain volume) to determine when a food item has been placed onto, or removed, from shelf 202. The use of pressure measurements provided by pressure sensor 212 could be also be combined with other techniques previously mentioned as well. For example, a camera with image identification of food items placed into, or removed from, appliance 100 could also be used along with the pressure measurements to determine when food items have been used or replenished. Using the teachings disclosed herein, one of ordinary skill in the art will understand that other applications for the information provided by pressure sensor 212 may also be utilized.

Fluid 218 may compressible or incompressible. For example, in certain exemplary embodiments, fluid 218 may be a e.g., glycol, water or other liquid. In other embodiments, fluid 218 may be air, an inert gas, or other gas. In addition to liquids and gases, semi-fluids like soft paraffins, emulsions and gels may also be used. For the use of a gas, resilient member 208 may also include a temperature sensor 214. In this case, changes in pressure of the gas along with the known temperature at the time of the pressure measurements can be used to calculated changes in the weight of food items place on shelf 202 as will be understood by one of skill in the art. As with pressure sensor 212, temperature sensor 214 may be contained within resilient member 208, self-powered, and provide wireless signals indicative of temperature measurements to controller 134 or may be connected to appliance 100 directly.

Other shapes for resilient member 208 may be used as well including e.g., C-shapes, L-shapes, and others provided such can be placed into mechanical communication with one or more shelves so that changes in the weight of one or more food items thereon can be determined. In addition, where pressure sensor 212 is used, the present invention does not require that resilient member 208 form a loop because changes in pressure will be communicated throughout the fluid 218 in chamber 210 regardless.

By way of additional example, FIGS. 6 and 7 provide view of another exemplary embodiment of a shelving assembly 300 of the present invention that may also be used in appliance 100. For this embodiment, shelves 320 and 322 are cantilevered from a vertical shelf support 324 that is attached to a slidable panel 326. The placement or removal of a food item on shelves 320 and 322 changes the pressure of the fluid 318 in sealed chamber 310 of resilient member 308. By way of example, the placement of food item M onto shelf 320 causes a force to be applied vertically downward (arrow D) by slidable panel 326 onto resilient member 308, which causes a change in pressure in fluid 318, which can be measured and utilized as previously described. Similarly, the removal of food item M lessens the force applied by slidable panel 326 to resilient member 308, which also causes a change to the pressure in fluid 318 that can be measured and used as previously described.

FIGS. 8 and 9 and illustrate another exemplary embodiment of a shelving assembly 400 of the present invention that may also be used in appliance 100. For this embodiment, shelves 420 and 422 are cantilevered from a vertical shelf support 424 that is attached to a rotatable panel 426. The placement or removal of food items on shelves 420 and 422 changes the pressure of the fluid 418 in sealed chamber 410 of resilient member 408. However, unlike the embodiment of assembly 300 in FIGS. 7 and 8, for shelving assembly 400 such change in pressure occurs due to application of a force F applied along lateral direction L as a result of a torque created by the weight of the food item. By way of example, the placement of food item M onto shelf 420 applies a torque TX as rotatable back panel 426 rotates about pivot point P. The distal end 428 applies a force F laterally to resilient member 408 squeezing it between panel 426 and rear wall 152. This in turn causes a change in pressure in fluid 418 that can be measured and utilized as previously described. Similarly, the removal of food item M lessens the force F applied by panel 426 to resilient member 408, which also causes a change to the pressure in fluid 418 that can be measured and used as previously described.

FIGS. 10 and 11 provide another exemplary embodiment 500 of a shelving assembly of the present invention as may be used in appliance 100. For this embodiment, shelf 502 is supported by shelf support 504, which in turn may be supported upon opposing sidewalls 140, rear wall 152, and/or other parts of appliance 100. Shelf 502 is configured for receipt of one or more food items placed on top surface 516.

In this exemplary embodiment, resilient member 508 forms a fluid circulation loop P (FIG. 10) that is positioned between shelf 502 and shelf support 504. Resilient member 508 is positioned in mechanical communication with shelf 502 as previously described and includes a sealed chamber 510 containing a fluid 518. As with previous embodiments, resilient member 508 may be constructed from a variety of flexible materials that will allow changes in the weight of items on shelf 202 to be transmitted to the fluid contained within sealed chamber 210. Other shapes for resilient member 508 may be used as well provided a loop is utilized for the circulation of fluid 518.

Referring to FIG. 10, a pump 534 circulates the fluid 518 located in resilient member 508 while a flow meter 532 provides for measurements of the rate of flow (arrows R) in loop P formed by resilient member 508. Flow rate meter 532 may be connected to controller 134 by wire or wirelessly using various signals including Wi-Fi, Bluetooth, Bluetooth Low Energy and others. By way of example, the placement or removal of an item on shelf 502 will cause changes to the measured flow rate of fluid in loop P created by pump 534, which is communicated to controller 134. Appliance 100 can use these changes in the flow rate measurements of fluid 518 to execute a variety of different actions helpful to the user.

For example, one or more decreases in the measured flow rate R could be used by controller 134 to send a notification to the user indicative of the consumption of one or more food items place on shelf 502 as previously described. Changes in flow rate can also be calibrated with the known quantities of food items (e.g., a known weight of a container of milk of a certain volume) to determine when a food item has been placed onto, or removed, from shelf 502. The use of flow rate measurements provided by flow meter 534 could be also be combined with other techniques previously mentioned as well. For example, a camera with image identification of food items placed into, or removed from, appliance 100 could also be used along with the flow rate measurements to determine when food items have been used or replenished. Using the teachings disclosed herein, one of ordinary skill in the art will understand that other applications for the information provided by flow meter 534 may also be utilized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
a cabinet defining a chamber for the receipt of food items;
a door rotatably supported by the cabinet to provide selective access to the chamber;
a shelving assembly comprising
 a shelf positioned in the chamber and configured for receipt of food items;
 a shelf support configured to support the shelf and food items placed thereon;
 a resilient member positioned in mechanical communication with the shelf such that food items place on the shelf causes the resilient member to be compressed, the resilient member including a sealed chamber containing a fluid; and
 a pressure sensor in communication with the fluid and configured to measure the pressure of fluid in the sealed chamber.

2. The refrigerator appliance of claim 1, wherein the pressure sensor is contained within the resilient member.

3. The refrigerator appliance of claim 1, wherein the fluid comprises a gas.

4. The refrigerator appliance of claim 1, wherein the fluid comprises a liquid.

5. The refrigerator appliance of claim 1, wherein the resilient member comprises a tube.

6. The refrigerator appliance of claim 1, wherein the shelf and shelf support are coextensive and define a perimeter, and wherein the resilient member extends around the perimeter between the shelf and shelf support.

7. The refrigerator appliance of claim 1, wherein the resilient member is positioned between the shelf and the shelf support.

8. The refrigerator appliance of claim 1, wherein the resilient member is positioned between the shelf support and a rear wall of the refrigerator appliance.

9. The refrigerator appliance of claim 1, wherein the pressure sensor provides a wireless signal to communicate pressure measurements.

10. The refrigerator appliance of claim 1, further comprising a controller in communication with the pressure sensor to receive pressure measurements therefrom.

11. The refrigerator appliance of claim 10, wherein the controller is configured to correlate the pressure measurements with a change in weight of food items placed on the shelf.

12. A refrigerator appliance, comprising:
a cabinet defining a chamber for the receipt of food items;
a door rotatably hinged to the cabinet to provide selective access to the chamber;
a shelving assembly comprising
 a shelf positioned in the chamber and configured for receipt of food items;
 a shelf support configured to support the shelf;
 a resilient member positioned in mechanical communication with the shelf such that food items placed on the shelf causes the resilient member to be compressed, the resilient member defining a sealed chamber containing a fluid within a loop;
 a pump for circulating fluid within the loop defined by the resilient member; and
 a flow meter for providing flow rate measurements on the flow of fluid within the loop of the resilient member.

13. The refrigerator appliance of claim 12, wherein the resilient member comprises a tube.

14. The refrigerator appliance of claim 12, wherein the shelf and shelf support are coextensive and define a perimeter, and wherein the resilient member extends around the perimeter between the shelf and the shelf support.

15. The refrigerator appliance of claim 12, wherein the resilient member is positioned between the shelf and the shelf support.

16. The refrigerator appliance of claim 12, wherein the resilient member is positioned between the shelf support and a rear wall of the refrigerator appliance.

17. The refrigerator appliance of claim 12, wherein the flow meter provides a wireless signal to communicate flow rate measurements.

18. The refrigerator appliance of claim 12, further comprising a controller in communication with the flow meter.

19. The refrigerator appliance of claim 18, wherein the controller is configured to correlate the flow rate measurements with changes in weight of food items place on the shelf.

* * * * *